United States Patent
Takahashi et al.

(10) Patent No.: US 6,339,865 B1
(45) Date of Patent: Jan. 22, 2002

(54) CORD FASTENER

(75) Inventors: Yoshinobu Takahashi, Toyama-ken (JP); Kazuhiko Tachibana, Kowloon (HK)

(73) Assignee: YKK Corporation, Tokyo (JP)

(*) Notice: Subject to any disclaimer, the term of this patent is extended or adjusted under 35 U.S.C. 154(b) by 0 days.

(21) Appl. No.: 09/461,889

(22) Filed: Dec. 15, 1999

(30) Foreign Application Priority Data

Dec. 28, 1998 (JP) .......................................... 10-372050

(51) Int. Cl.[7] .............................................. F16G 11/00
(52) U.S. Cl. ...................... 24/136 R; 24/115 G; 24/306
(58) Field of Search ............................ 24/712.1–712.5, 24/115 K, 115 G, 115 J, 115 N, 122.6, 136 R, 306; 403/208–210, 212, 216; 2/265, 321, 312; 428/100

(56) References Cited

U.S. PATENT DOCUMENTS

| | | | |
|---|---|---|---|
| RE27,986 E | * 4/1974 | Jensen ................... | 24/115 G X |
| 4,393,550 A | * 7/1983 | Yang et al. ............ | 24/115 G X |
| 4,506,417 A | * 3/1985 | Hara ........................ | 24/115 G |
| 4,732,631 A | 3/1988 | Shimizu | |
| 4,811,466 A | * 3/1989 | Zubil ....................... | 24/115 G |
| 5,029,371 A | * 7/1991 | Rosenblood et al. . | 24/115 G X |
| 5,671,508 A | 9/1997 | Murai | |
| 5,700,340 A | 12/1997 | Johnson et al. | |
| 5,732,445 A | * 3/1998 | Stodolka et al. ........... | 24/16 R |
| 5,903,959 A | * 5/1999 | Leonardi ................... | 24/712.1 |

FOREIGN PATENT DOCUMENTS

| | | |
|---|---|---|
| EP | 0 289 358 | 11/1988 |
| EP | 0 291 154 | 11/1988 |
| EP | 0 486 779 | 5/1992 |

* cited by examiner

*Primary Examiner*—Robert J. Sandy
(74) *Attorney, Agent, or Firm*—Finnegan, Henderson, Farabow, Garrett & Dunner, L.L.P.

(57) ABSTRACT

This invention provides a cord fastener wherein a tightening cord is threaded through or an end of the tightening cord is nipped thereby, the cord fastener being captured and fixed easily with stability on the surface of a down jacket with hood and the like. This cord fastener comprises a cylindrical main body having a bottom and a pair of cam faces at a bottom thereof and a sliding body capable of fitting in an inside of the main body and containing a body portion provided at an upper portion thereof and a pair of elastic leg portions at a lower portion thereof. Insertion holes for a tightening cord are provided in the main body and sliding body. The sliding body is inserted into the main body and then the tightening cord is inserted while pressing the sliding body. When the pressing is released, the sliding body is resiled so that the tightening cord is fixed. A surface fastener member is provided on a surface of the main-body perpendicular to the insertion hole by integral molding or bonding. Other surface fastener member is attached to a surface of a ski wear and the like and by engaging both the surface fastener members with each other, the cord fastener is captured and fixed. As a result, such an event that the cord fastener may swing during a motion of user or due to a strong wind thereby giving a uncomfortable feeling is eliminated.

10 Claims, 12 Drawing Sheets

CORD FASTENER

BACKGROUND OF THE INVENTION

1. Field of the Invention

The present invention relates to a cord fastener, which is used by threading a tightening cord attached to a periphery of collar, waist, sleeve edge and hood of a ski wear, down jacket with hood, half coat and the like therethrough and fixed, or which is used to prevent the tightening cord from slipping out by being fixed to an end of the tightening cord, and further a cord fastener attached to an end of a gripping cord as a pull tab of slider of a slide fastener provided on the surface of a traveling caster bag or the like.

2. Description of the Related Art

As a conventional cord fastener through which the tightening cord is threaded, Japanese Utility Model Publication No. 1-39449 has disclosed a cord fastener in which as shown in FIG. 16, a cord insertion hole 15' is provided in a body portion 14' of a sliding body 2', a pair of leg portions 18' having an elasticity are provided below the body portion 2', while a cord insertion hole 15' is provided in a cylindrical body 1' having a bottom and a pair of slopes 9' are formed at a bottom portion inside the cylinder thereby providing the sliding body 2' with a resilient function by disposing the pair of the elastic leg portions 18' and the slopes 9' so that they oppose each other.

Further, Japanese Patent Laid-Open Publication No. 9-23909 has disclosed a cord fastener comprising, as shown in FIG. 17, a spherical main body 101' having a hollow portion 105' in which a sliding body 102' can fit and slide along a guide portion 108' and cord insertion holes 107' on both sides, the sliding body 102' having a pair of elastic leg portions 108' extending downward from a bottom face of a head portion 113' thereof and a pair of supporting pieces 121', while a cord insertion hole 115' is made in the supporting piece 121' such that a bottom of the head portion 113' is in contact with a top portion of the cord insertion hole 115'. In this cord fastener, after the sliding body 102' is inserted into the main body 101' and an end of the tightening cord is inserted along the bottom face of the head portion 113', it is inserted through the cord insertion hole 107' in the main body 101' and the elastic leg portions 118' are resiled by the slopes formed at a bottom portion of the hollow portion 105', so that the sliding body 102' is resiled upward so as to fasten the tightening cord.

According to a cord fastener disclosed in Japanese Patent Laid-Open Publication No. 8-332104, in which an end portion of the tightening cord is nipped, as shown in FIG. 18, the cord fastener is formed of a pair of nipping bodies 3' having the same shape, and the nipping bodies 3' forms an opening through which the tightening cord is inserted, at an end thereof and contains an accommodating portion 25' for holding the tightening cord inward of the opening, several pieces of projecting portions 29' are provided so as to project on opposing faces of the accommodating portion 25' so as to hold the tightening cord, and engaging portions 27' for holding mating nipping bodies 3' are provided on both sides of the accommodating portion 25' to nip the end of the tightening cord.

Because both the cord fastener through which the tightening cord is threaded and the cord fastener in which an end of the tightening cord is nipped have a smooth surface, they are difficult to capture and fix, and therefore, the cord fastener swings freely when a user takes exercise wearing clothes using the same cord fastener or the wind is strong, thereby it is unsightly to see or it may hit the user's face.

SUMMARY OF THE INVENTION

Accordingly the present invention has been developed in views of the above problems, and therefore, an object according to a first aspect of the present invention is to provide a cord fastener made of thermoplastic resin, having a holding mechanism capable of capturing and holding the cord fastener in which a tightening cord is inserted through or an end of the tightening cord is nipped, with stability, the cord fastener having a surface fastener member on the surface of the cord fastener as the holding mechanism.

It is also an object of the invention to provide a cord fastener, through which the tightening cord is threaded, comprising a sliding body having an elasticity and a main body in which the sliding body can fit, wherein a surface fastener member is disposed on the surface of the main body as a holding mechanism.

Another object of the invention is to provide a cord fastener in which an end of the tightening cord is nipped, comprising a pair of nipping bodies of the same shape in which the nipping bodies are superimposed, wherein a surface fastener member is disposed on the surface of the nipping body as a holding mechanism.

Further object of the invention is to provide a cord fastener wherein a male portion of the surface fastener member is disposed as a holding mechanism on a surface of one side of the main body or combined nipping bodies of the cord fastener, the configuration of the male portion being specified so as to perform an excellent holding function.

Still further object of the invention is to provide a cord fastener, wherein a male portion, a female portion or female/male mixing portion of the surface fastener member is disposed as a holding mechanism on a surface of one side of the main body or combined nipping bodies of the cord fastener, thereby an excellent holding function being performed depending on use condition of each thereof.

Another object of the invention is to provide a cord fastener, wherein a surface fastener member is disposed as a holding mechanism on surfaces of both sides of the main body or combined nipping bodies of the cord fastener so that any of the surfaces is capable of engaging thereby performing an excellent holding function.

Still another object of the invention is to provide a cord fastener wherein a surface fastener member is disposed as a holding mechanism on the surface of the main body or nipping body and the other surface fastener member is disposed as a holding mechanism on the surface of a product using this cord fastener such that both the surface fastener members are capable of engaging with each other, thereby determining a holding place on the product so that the cord fastener can be fixed easily and provides a neat appearance.

To achieve the above objects, according to the invention, there is provided a cord fastener made of thermoplastic resin having cord insertion holes through which a tightening cord is threaded, wherein a surface fastener member is disposed by integral molding or fusing as a holding mechanism on an outside face of the cord fastener away from the cord insertion holes in the cord fastener.

Preferably, the cord fastener further comprises a sliding body having the cord insertion hole through which the tightening cord is inserted, passing to both sides and an elastic mechanism having an elasticity provided at a bottom thereof and a cylindrical or spherical main body engaging with the sliding body and having an escape preventing mechanism for preventing the sliding body from being escaped and the cord insertion hole through which the tightening cord passes, provided on both sides thereof, wherein the surface fastener member is disposed on an outside face of the main body.

Also preferably, the cord fastener further comprises a pair of nipping bodies which engage with each other by superimposing, wherein the cord insertion hole in which the tightening cord can be inserted is provided at a top portion of the pair of the nipping bodies, cord nipping mechanism is provided on opposing faces of the nipping bodies and the surface fastener member is disposed on an outside face of the nipping body.

Preferably, a male portion of the surface fastener member disposed on an outside face of the main body or nipping body is formed integrally with the main body or nipping body by injection molding means or extrusion means.

Alternatively, the surface fastener member disposed on the outside surface of the main body or nipping body is formed by fusing or bonding a male portion of the surface fastener member formed by injection molding means or extrusion means to the surface of the main body or nipping body.

Also alternatively, the surface fastener member disposed on the outside surface of the main body or nipping body is the surface fastener member formed by weaving or knitting multi-filament or mono-filament of synthetic fiber, the surface fastener member comprising the male portion, female portion or female/male mixing portion and being bonded to the surface of the main body or nipping body.

Also preferably, the surface fastener member is disposed on the both outside surfaces of the main body or the both outside surfaces of the nipping bodies by integral molding, fusion or bonding.

Further preferably, the surface fastener member is disposed on the outside surface of the main body or nipping body and other surface fastener member engaging the surface fastener member is disposed on part of a surface of a product using the cord fastener, for example, a ski wear and down jacket with hood, such that both the surface fastener members are capable of engaging with each other.

DESCRIPTION OF THE PREFERRED EMBODIMENTS

Hereinafter, embodiments of the cord fastener of the present invention will be described with reference to the accompanying drawings.

The cord fastener of the present invention comprises a main body 1 which is cylindrical and has a bottom as shown in FIGS. 1 to 4 and a sliding body 2 including a cylindrical body portion 14 disposed at a upper side and a pair of elastic leg portions 18 having an elasticity and disposed at a lower side thereof. The sliding body 2 is formed to be fit into the main body 1 and each of the main body 1 and sliding body 2 is integrally molded by injection molding means or extrusion means using such thermoplastic resin as polyamide, polyacetal, and polypropylene.

Figure 3:
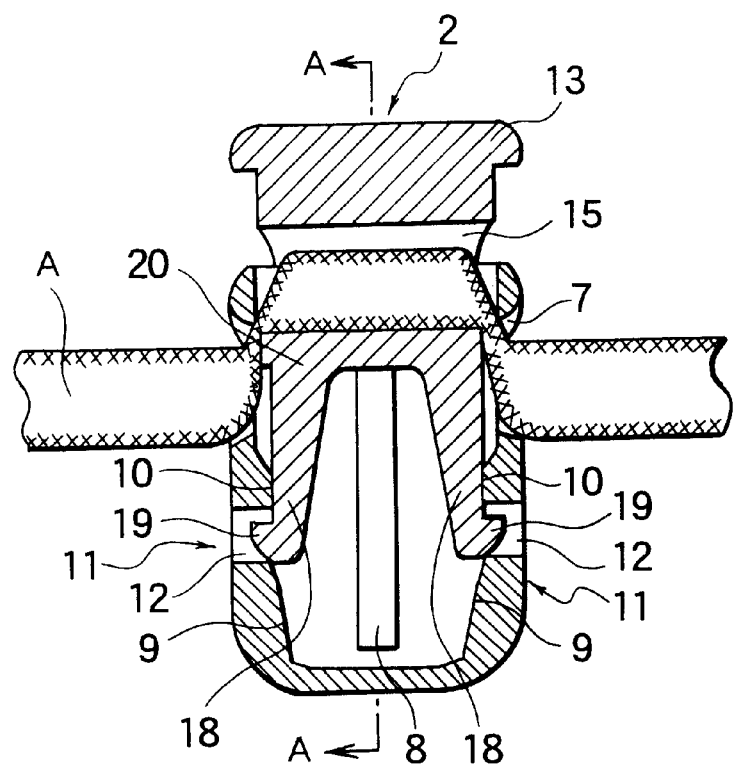
FIG. 3 is a sectional view taken along the line B—B showing an engaged state of the same cord fastener.
Figure 4:
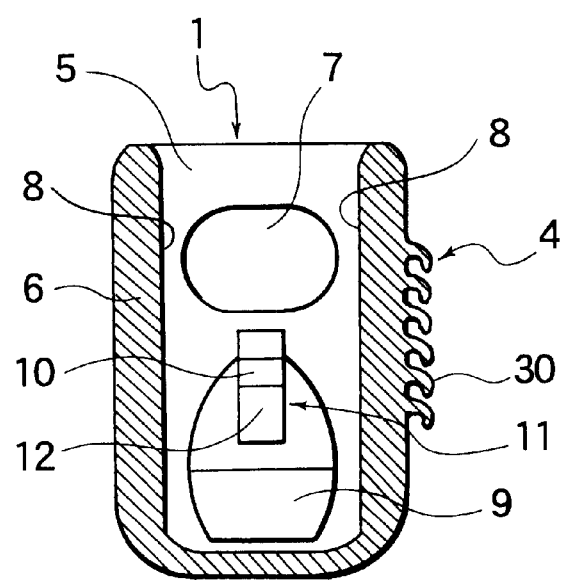
FIG. 4 is a longitudinal sectional view of main body of the same cord fastener.

The main body 1 is circular in its lateral section and has an accommodating portion 5 in which the sliding body 2 can fit in a center thereof. Oval cord insertion holes 7 through which a tightening cord A can be inserted are made in top portions of both sides of a cylindrical wall 6 on an external face of this accommodating portion 5. A guide stripe 8 having a convex section is provided on an inner face perpendicular to this cord insertion hole 7 and an inclined flat cam face 9 is formed on an inner face downward of the cord insertion hole 7. As shown in FIGS. 3 and 4, a projected portion 10 which is projected inward is provided in the center above the cam face 9 and through holes 12 as escape preventing mechanism 11 are made below each of the projected portions 10.

Figure 1:
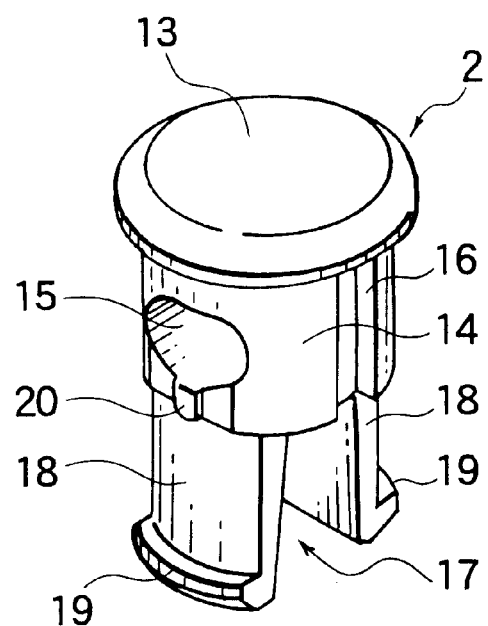
FIG. 1 is a perspective view showing a state in which a cord fastener of a first embodiment is disassembled.
Figure 1:
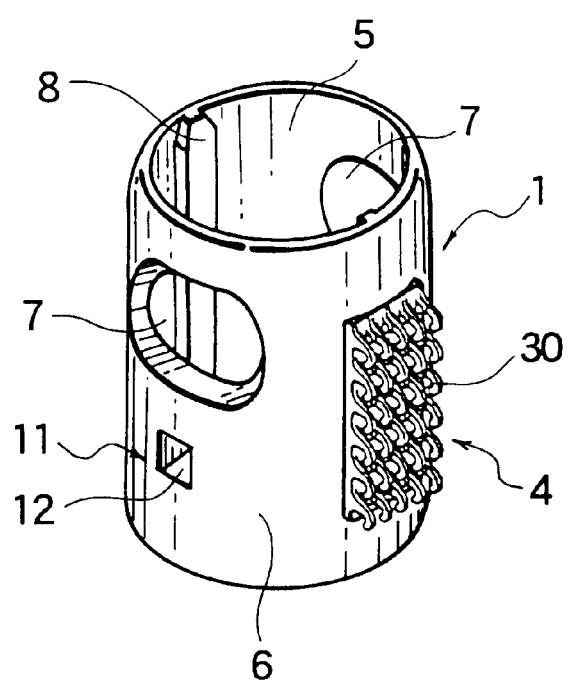
Figure 2:
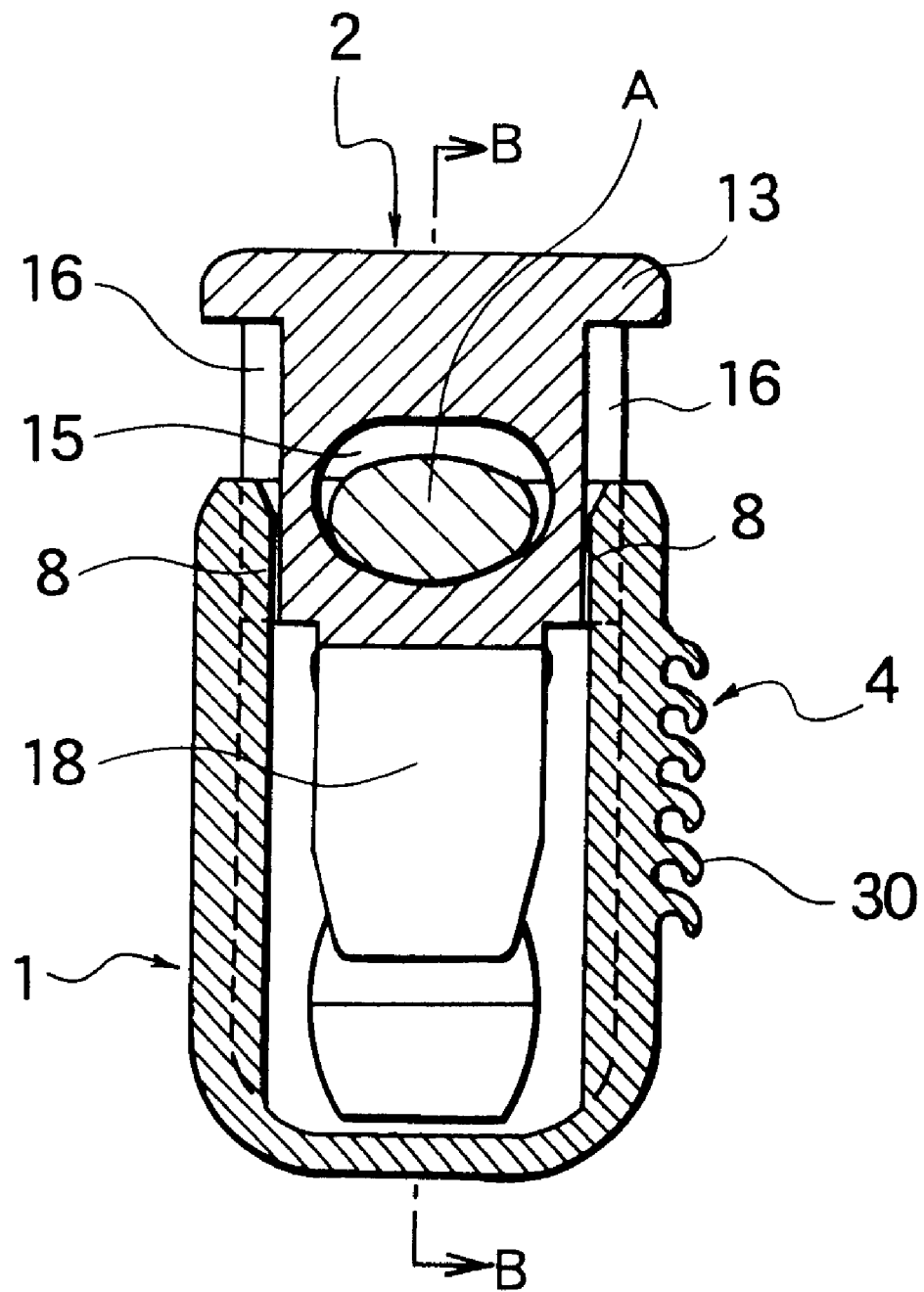
FIG. 2 is a sectional view taken along the line A—A showing an engaged state of the same cord fastener.

A feature of the cord fastener of the present invention is that, as shown in FIGS. 1, 2 and 4, a flat base plate is provided on an outside surface of the cylindrical wall 6 perpendicular to the cord insertion holes 7 through which the tightening cord A is inserted of the main body 1 and male portions 30 of a surface fastener member 4 in the form of a hook or mushroom are formed integrally on that base plate. When the main body 1 is formed by injection molding means or extrusion means using thermoplastic resin, the male portions 30 of the surface fastener member 4 are molded integrally at the same time so that they are formed on the outside surface of the flat substrate of the main body 1.

According to this embodiment, each of the male portions 30 of the surface fastener member 4 is a hook and five rows are provided with six hooks arranged vertically on each of the rows. Directions of the hooks of all the rows are the same such that they are formed downward.

The sliding body 2 has a flat plate like head portion 13 substantially coinciding with an outside diameter of the main body 1 at a top thereof as shown in FIG. 1 and the body portion 14 which is capable of fitting into the accommodating portion 5 is provided below this head portion 13. A cord insertion hole 15 through which the tightening cord A can be threaded laterally is made in this body portion 14 and a concave guide groove 16 is provided on an outside face perpendicular to the cord insertion hole 15, so that the guide stripe 8 is fit therewith. A pair of the elastic leg portions 18 having an elasticity, which are separated at both sides and extend downward, are provided as an elastic mechanism 17 below the body portion 14 having the cord insertion hole 15. An edge portion 19 which is circular and bent outward is provided at an end of each of the elastic leg portions 18. This edge portion 19 is in a sliding contact with the cam face 9 formed at a bottom portion of the accommodating portion 5 and then, part of the edge portion 19 serves as the escape preventing mechanism 11 which is inserted into the through hole 12 provided in the cylindrical wall 6 as shown in FIG. 3 so as to prevent the sliding body 2 from being removed from the main body 1.

A projecting portion 20 projecting below the cord insertion hole 15 also prevents the sliding body 2 from being removed from the main body 1 when the tightening cord A is inserted, and when the sliding body 2 is pressed down, the projecting portion 20 comes into contact with a lower edge of the cord insertion hole 7 thereby restricting a sliding of the sliding body 2 so as to make the cord insertion hole 7 align with the cord insertion hole 15.

The elastic leg portion 18 is fit into the accommodating portion 5 such that the guide groove 16 of the sliding body 2 comes into a contact with the guide stripe 8 of the main body 1, and when the sliding body 2 is pressed downward, the projecting portion 20 comes into contact with the cylindrical wall 6 and stops there. At this time, the pair of the elastic leg portions 18 press the cam face 9. With this state, an end of the tightening cord A is inserted through the cord insertion hole 7 of one side of the main body 1, cord insertion hole 15 of the sliding body 2 and then the cord insertion hole 7 of the other side. When pressing of the sliding body 2 is released, the sliding body 2 is elastically resiled upward by an elastic force of the elastic leg portions 18 and at the same time, the tightening cord A is nipped by the cord insertion holes 7 and cord insertion hole 15 so as to fix the cord fastener.

Figure 15:
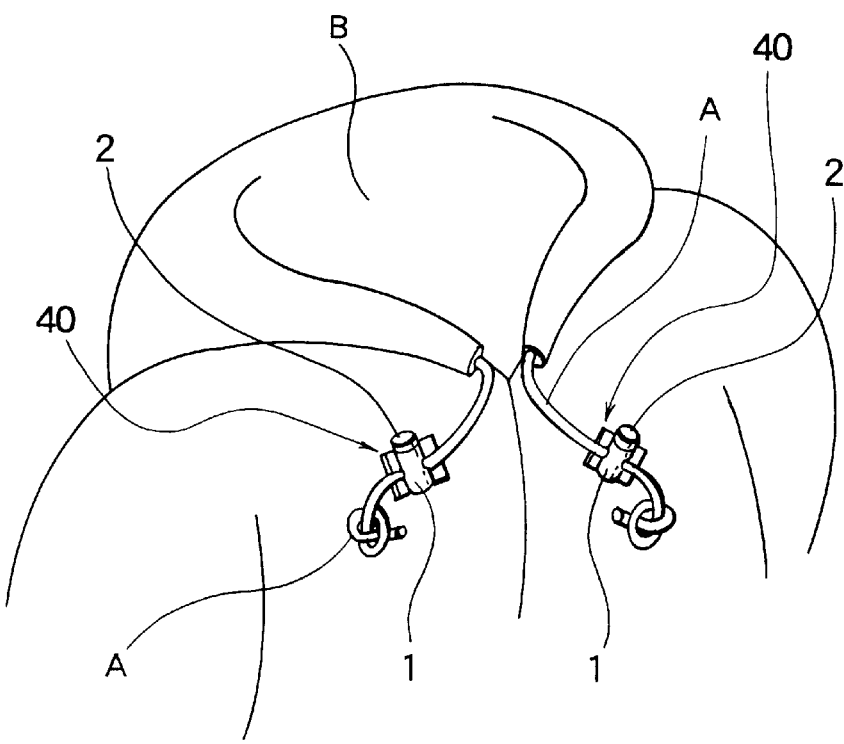
FIG. 15 is a perspective view showing a state in which the cord fastener is in use.
Figure 16:
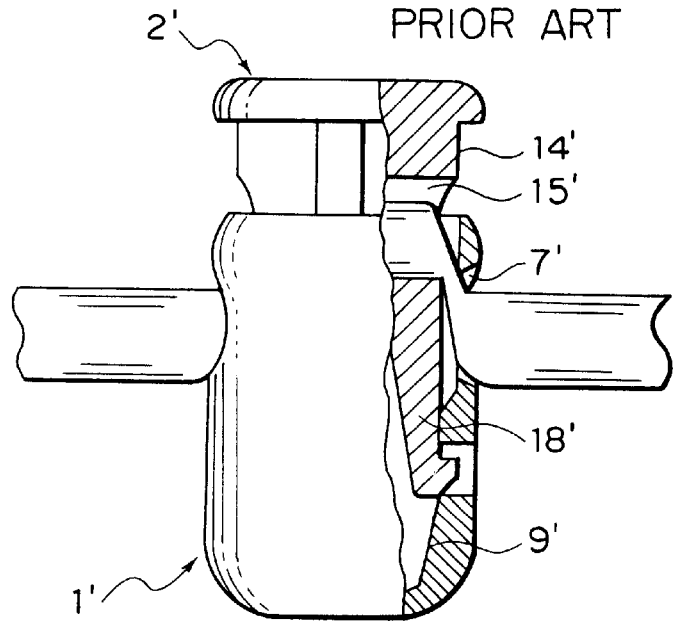
FIG. 16 is a front view partially broken showing an engaged state of the cord fastener of a first known example.
Figure 17:
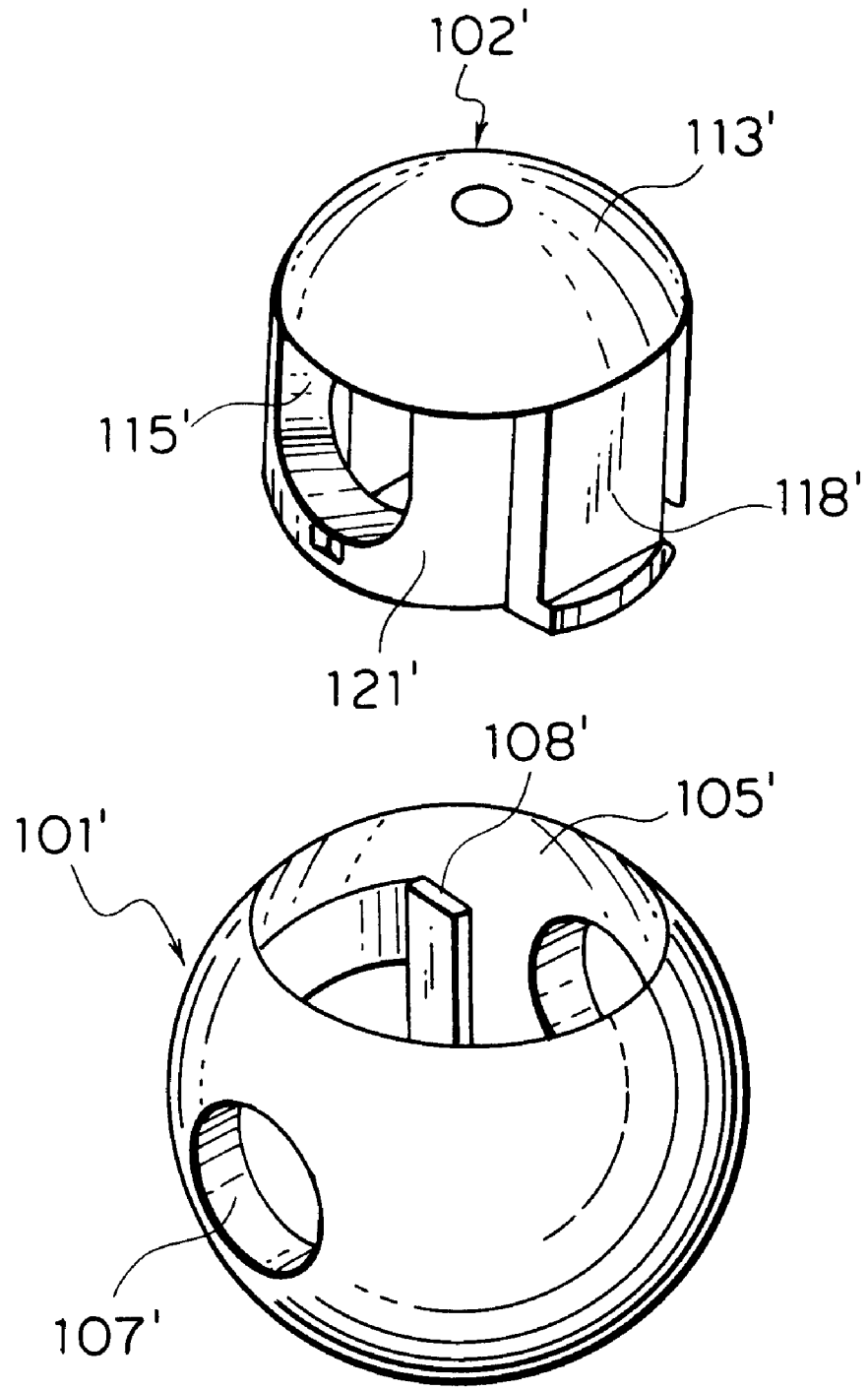
FIG. 17 is a perspective view showing a state in which the cord fastener of a second known example is disassembled.
Figure 18:
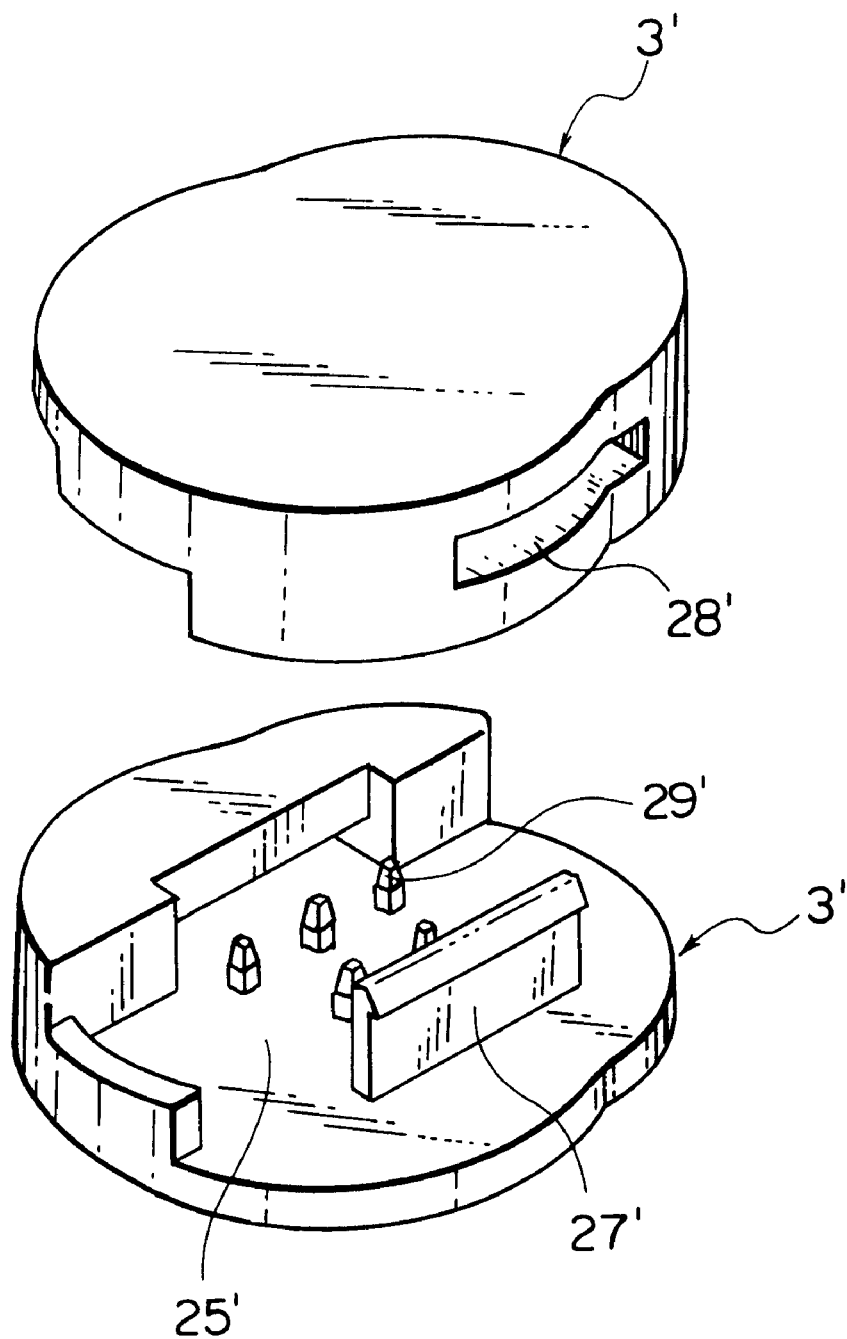
FIG. 18 is a perspective view showing a state in which the cord fastener of a third known example is disassembled.

The cord fastener fixed on the tightening cord A engages a surface fastener member 40 disposed on the surface of a product using the cord fastener, for example, a ski wear B shown in FIG. 15 by means of the surface fastener member 4 formed on an outside surface of the main body 1, so that the cord fastener is captured and never swings.

As the elastic mechanism 17 disposed at the bottom portion of the sliding body 2, it is permissible to dispose an appropriate spring such as a coil spring below the body portion 14 instead of the elastic leg portion 18 such that it is located to oppose the main body 1 so as to form another elastic mechanism 17. In this case, the cam faces 9 do not have to be provided at a bottom portion of the main body 1 having a bottom, but that portion only has to be formed so as to facilitate fixing of the spring.

Figure 5:
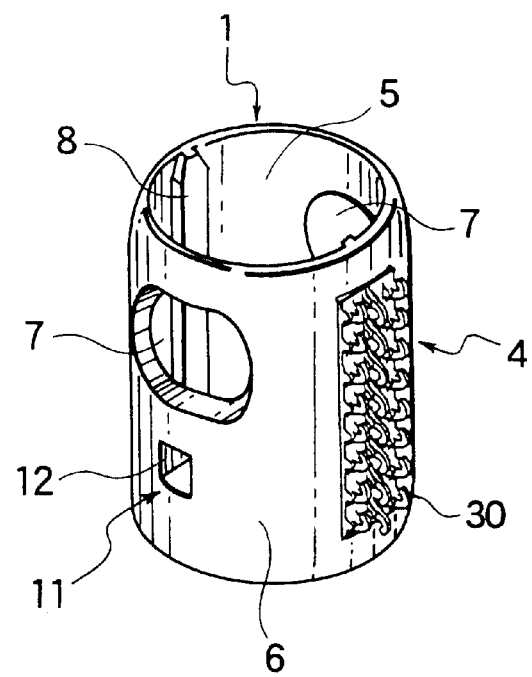
FIG. 5 is a perspective view showing a first modification of the main body of the same cord fastener.

According to a first modification of the main body 1 of the cord fastener, in the cord fastener shown in FIG. 5, the male portion 30 of the surface fastener member 4 formed on a flat plane of one side of an outside surface of the cylindrical wall 6 of the cylindrical main body 1, which is perpendicular to the cord insertion holes 7, are formed such that three rows of hooks are disposed so that they are directed upward or downward alternately with eight hooks being arranged vertically in a single row. To have such a configuration, the male portion 30 of the surface fastener member 4 is formed integrally with the main body 1 using thermoplastic resin. The configuration of the male portion 30 may be modified arbitrarily and the remaining structure is the same as the first embodiment.

Figure 6:
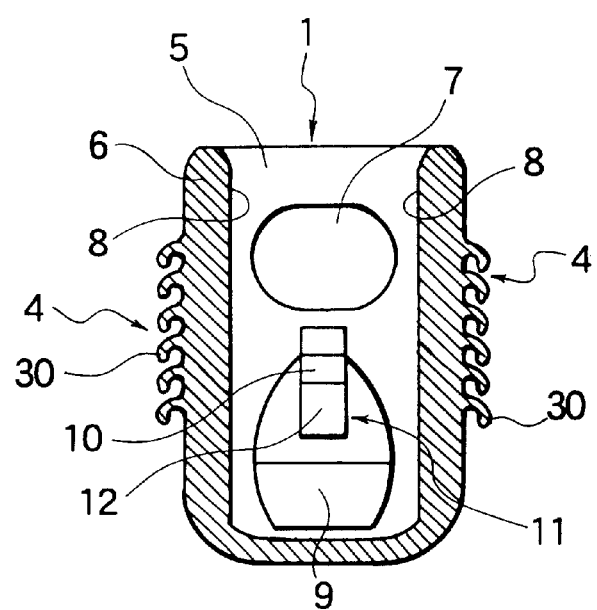
FIG. 6 is a longitudinal sectional view showing a second modification of the main body of the same cord fastener.

According to a second modification of the main body 1 of the cord fastener, as shown in FIG. 6, the male portion 30 of the surface fastener member 4 is molded integrally with the main body 1 using thermoplastic resin, on each of flat planes on both sides of the outside face of the cylindrical wall 6 of the main body 1, the flat planes being perpendicular to the cord insertion holes 7. The male portions 30 of the surface fastener members 4 are formed on both side faces of the main body 1. The remaining structure is the same as the first embodiment.

Figure 7:
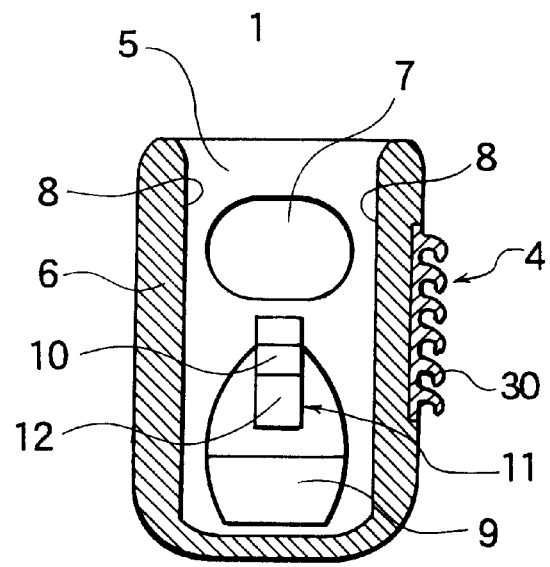
FIG. 7 is a longitudinal sectional view showing a third modification of the main body of the same cord fastener.

According to a third modification of the main body 1 of the cord fastener, as shown in FIG. 7, the male portion 30 of the surface fastener member 4 molded integrally by injection molding means or extrusion means using thermoplastic resin is fixed on a plane of one side of the outside face of the cylindrical wall 6 of the main body 1, the plane being perpendicular to the cord insertion hole 7, by fusion by heat or using adhesive agent. The remaining structure is the same as the first embodiment.

Figure 8:
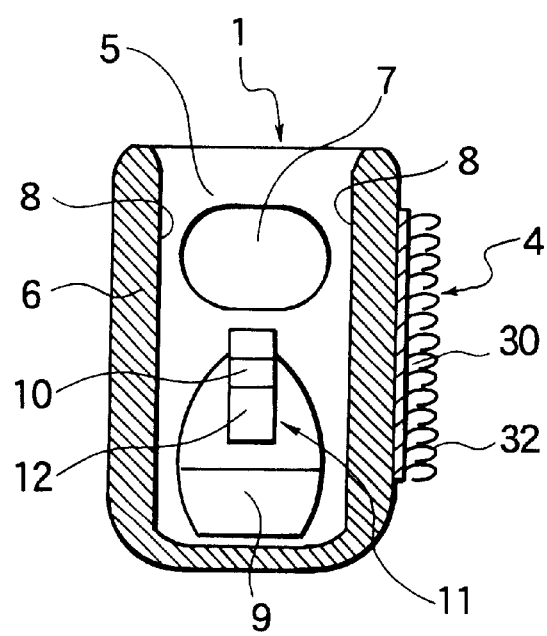
FIG. 8 is a longitudinal sectional view showing a fourth modification of the main body of the same cord fastener.

According to a fourth modification of the main body 1 of the cord fastener, as shown in FIG. 8, the male portion 30 or female/male mixing portion of the surface fastener member 4 is formed on a plane of one side of the outside face of the cylindrical wall 6 of the main body 1, the plane being perpendicular to the cord insertion hole 7 by weaving or knitting multi-filament 33 and mono-filament 32 of synthetic fiber such as polyamide and polyester and this surface fastener member 4 is bonded to the main body 1 using adhesive agent. The remaining structure is the same as the first embodiment.

Figure 9:
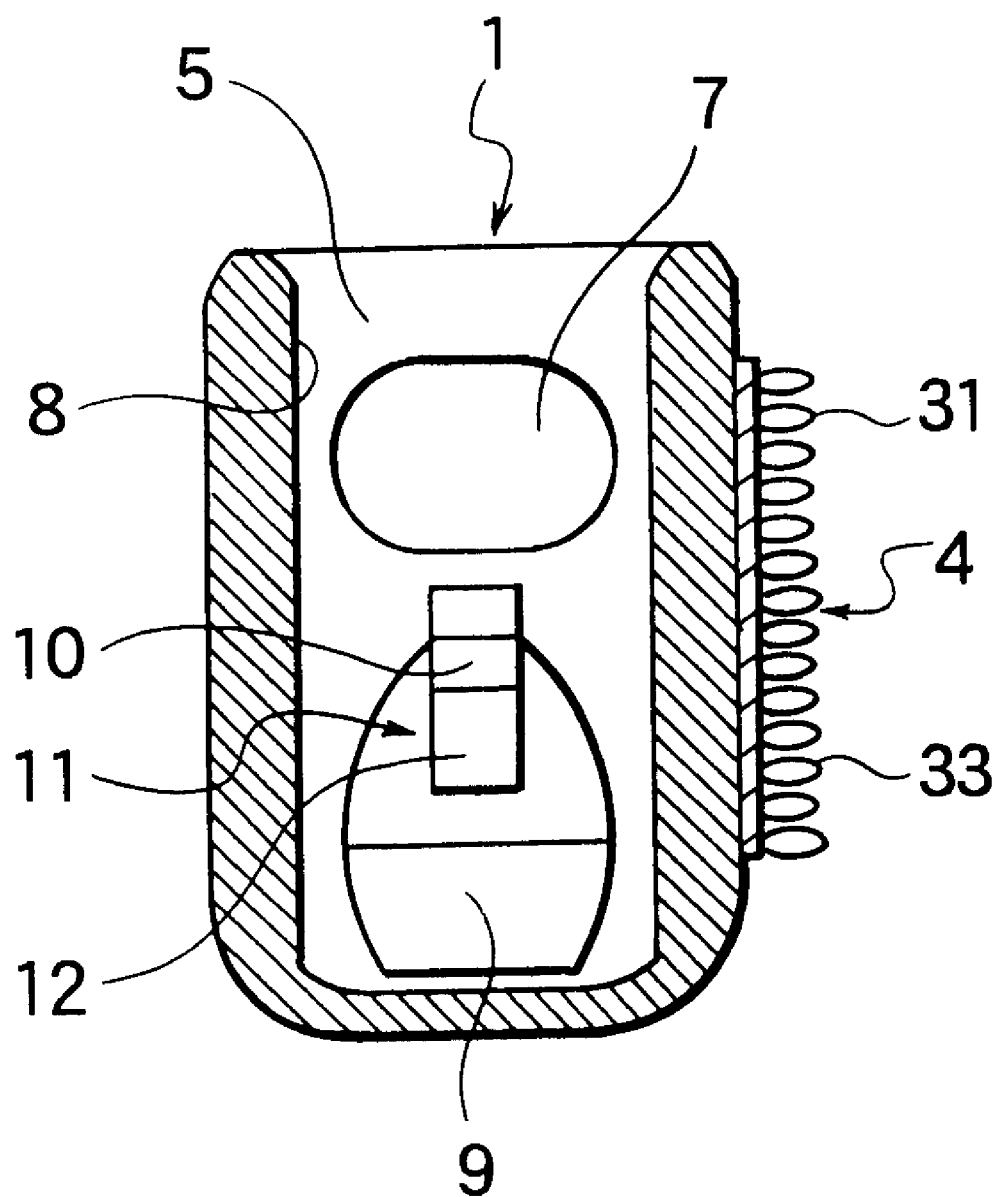
FIG. 9 is a longitudinal sectional view showing a fifth modification of the main body of the same cord fastener.

According to a fifth modification of the main body 1 of the cord fastener, as shown in FIG. 9, a female portion 31 of the surface fastener member 4 is formed on a plane of one side of the outside face of the cylindrical wall 6 of the main body 1, the plane being perpendicular to the cord insertion hole 7 by weaving or knitting, or brushing after weaving or knitting multi-filament 33 of synthetic fiber in the form of loops and this surface fastener member 4 is bonded to the main body 1 using adhesive agent. The remaining structure is the same as the first embodiment.

Figure 10:
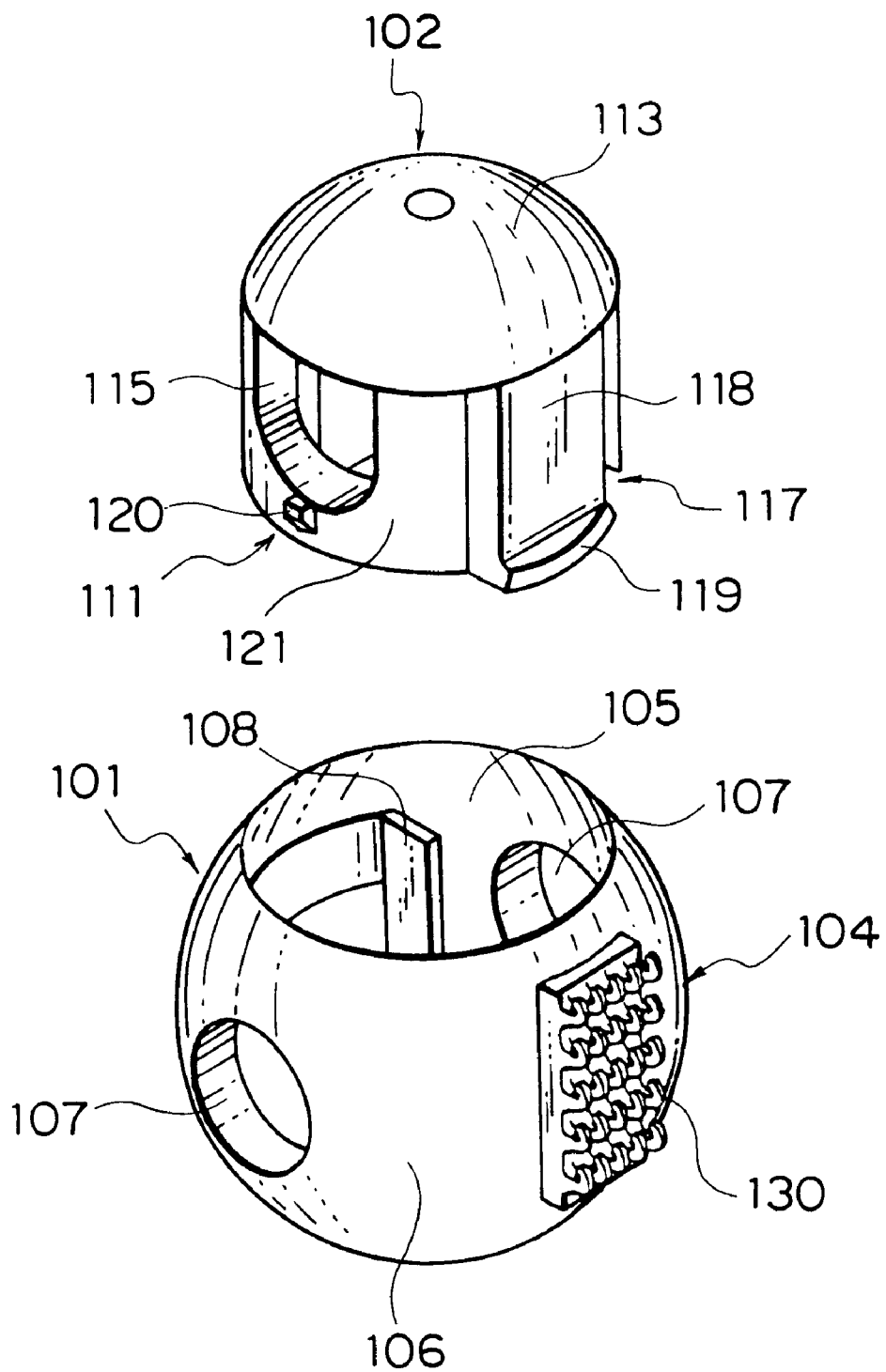
FIG. 10 is a perspective view showing a state in which the cord fastener of a second embodiment is disassembled.
Figure 11:
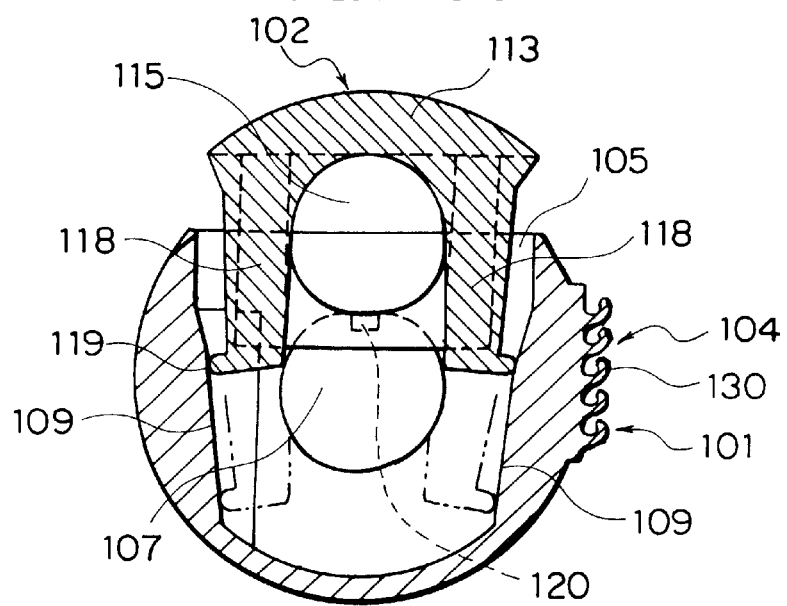
FIG. 11 is a longitudinal sectional view showing an engaged state of the same cord fastener.

A second embodiment of the cord fastener will be described with reference to FIGS. 10 and 11. A main body 101 formed of thermoplastic resin is entirely spherical and contains an accommodating portion 105 having a bottom in which a sliding body 102 can be fit in vertically in the center thereof and cord insertion holes 107 through which the tightening cord A can pass are provided on both sides of this accommodating portion 105. Two guide stripes 108 or a single guide stripe 108 is provided between those cord insertion holes 107. A pair of cam faces 109 are formed below the guide stripes 108 as shown in FIG. 11.

Then, a male portion 130 of a surface fastener member 104 is formed integrally in the form of a upward directing hook or mushroom on a surface of a cylindrical wall 106, perpendicular to the cord insertion hole 107 through which the tightening cord A is threaded. The male portion 130 of the surface fastener member 104 is molded integrally on a flat surface formed on the spherical wall 106 such that it presents hook shape or mushroom shape, when the main body 101 is formed by injection molding or extrusion using thermoplastic resin.

In the sliding body 102, a pair of supporting pieces 121 each having a cord insertion hole 115 through which the tightening cord A is threaded are provided so as to oppose each other to extend from a periphery of a bottom portion of a head portion 113 produced by cutting a sphere. Then, a pair of elastic leg portions 118 having an elasticity, to be fit into the accommodating portion 105, are provided so as to oppose each other between the supporting pieces 121 as elastic mechanism 117. Further, a projecting portion 120 projecting outside is provided on a lower edge of the cord insertion hole 115 as an escape preventing mechanism 111, to be disposed in the cord insertion hole 107 of the main body 101. As the elastic mechanism 117, an edge portion 119 bent outward is provided on an end of the elastic leg portion 118 so that the edge portion 119 comes in a sliding contact with the cam face 109.

The sliding body 102 is fit into the accommodating portion 105 by introducing the elastic leg portion 118 along the guide stripe 108 and by pressing the head portion 113, the projecting portion 120 is made to fit in the cord insertion hole 107. By pressing the head portion 113 further, the cord insertion holes 107 in the main body 101 are made to align with the cord insertion holes 115 of the sliding body 102. Then, the tightening cord A is inserted through the cord insertion holes 107 and cord insertion holes 115 and when the pressing is released, the elastic leg portions 118 are resiled by the cam faces 109, so that the sliding body 102 is resiled upward thereby the tightening cord A being held. As a result, the cord fastener is fixed.

The male portion 130 of the surface fastener member 104 formed on the outside surface of the main body 101 engages with a female portion 31 of the surface fastener member 40 disposed on the surface of a product using this cord fastener so that the cord fastener is captured and never swings freely. The structures of the surface fastener member 104 and male portion 130 may have any of the structures of the first to fifth modifications described in the first embodiment.

Figure 12:
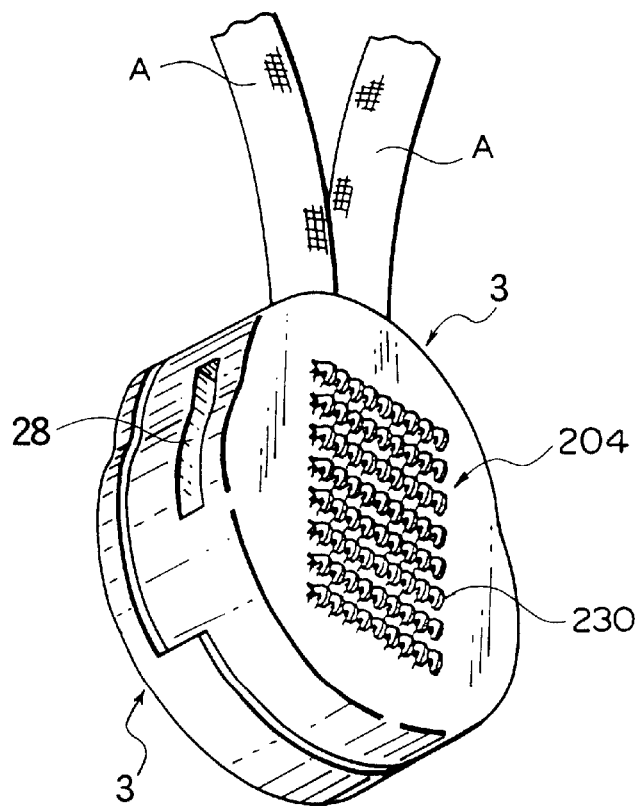
FIG. 12 is a perspective view showing an engaged state of the cord fastener of a third embodiment.

Finally, a third embodiment of the cord fastener will be described with reference to FIGS. 12 to 14. This cord fastener nips end portions of the tightening cord A upon use. The cord fastener comprises a pair of nipping bodies 3 having the same configuration and each of the nipping body 3 has an opening 22 through which the tightening cord A is inserted. When the nipping bodies 3 are superimposed, the openings 22 form a cord insertion hole 23 through which the tightening cord A can be inserted. Meanwhile, a pair of the nipping bodies 3 may be not always of the same configuration.

An accommodating portion 25 capable of accommodating two ends of tightening cord A is formed inward of the opening 22 of the nipping bodies 3. As shown in FIG. 14, in this accommodating portion 25, a partition wall 24 is provided so as to project on one of the nipping bodies 3, so that when the nipping bodies 3 are superimposed, the accommodating portion 25 is formed. Several projecting portions 29 are formed so as to project on each of opposing walls of the accommodating portion 25 as a nipping mechanism 26 so as to press the tightening cord A, and then, engaging pieces 27 are formed on the other side to the partition walls 24, having an end of a hook shape. Then, engaging holes 28 open outside are provided outside of the partition wall 24 so as to engage the engaging piece 27 of the mating nipping body 3.

As the nipping mechanism 26 for nipping the tightening cord A, a protruded piece may be provided to have sawteeth at an end thereof in the accommodating portion 25 instead of the projecting portion 29, such that it extends in a direction perpendicular to a length direction of the tightening cord A.

Also, only one end of the tightening cord A may be held in the accommodating portion 25.

A male portion 230 of a surface fastener member 204 is molded integrally in the form of a hook or mushroom on the surface of one of the pair of the nipping bodies 3 at the same time when the nipping body 3 is formed by injection molding or extrusion using thermoplastic resin.

Figure 13:
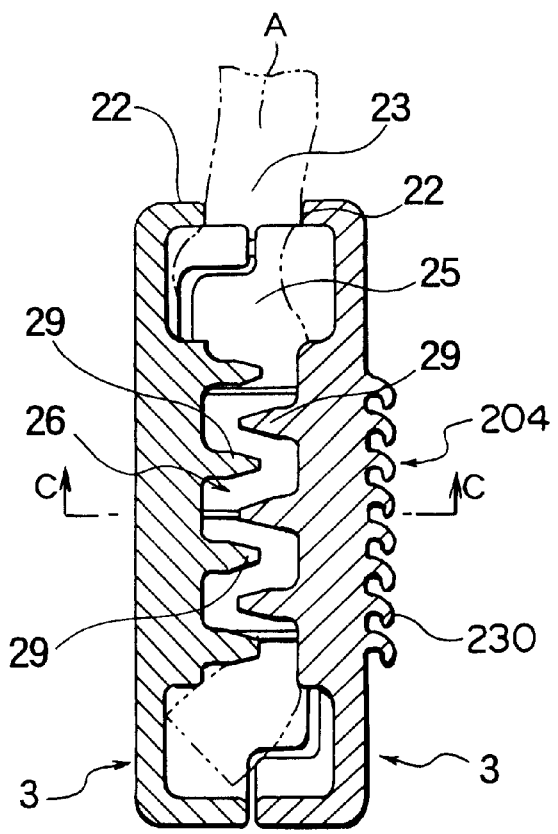
FIG. 13 is a longitudinal sectional view showing an engaged state of the same cord fastener.
Figure 14:
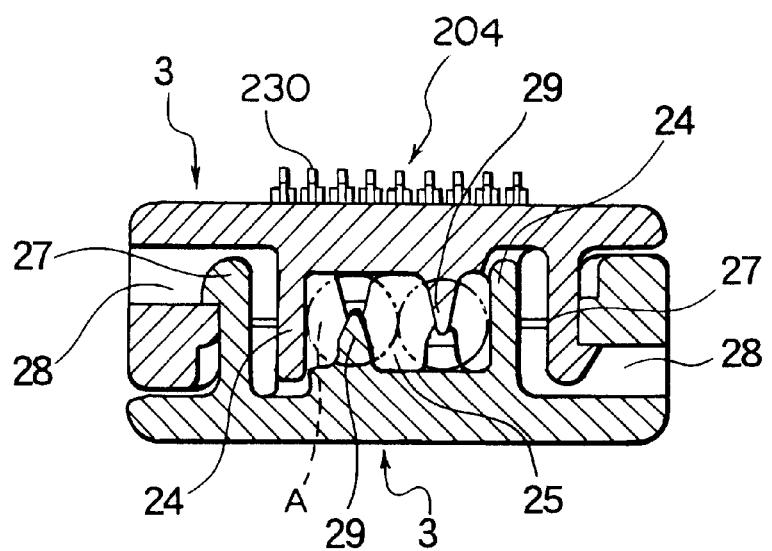
FIG. 14 is a sectional view taken along the line C—C showing an engaged state of the same cord fastener.

To nip the tightening cord A between the pair of the nipping bodies 3, as shown in FIG. 13, the tightening cord A is placed on one nipping body 3 from the opening 22 thereof up to the accommodating portion 25 with ends of the tightening cord A are doubled and the other nipping body 3 is superimposed thereon. By engaging the respective engaging pieces 27 with the engaging holes 28, the cord fastener can be fixed with the ends of the tightening cord A nipped between the nipping bodies 3.

The cord fastener in which the nipping bodies 3 are superimposed engages with the female portion 31 of the other surface fastener member 40 disposed on a surface of a product using the same cord fastener via the male portion 230 of the surface fastener member 204 formed on an outside surface of the nipping body 3 like the previous embodiments, so that it is captured and never swing freely.

Although the male portion 230 has nine rows of the hooks arranged vertically with each row containing eight hooks and all the hooks are arranged in the same direction and downward, partly a row of hooks may be arranged in an opposite direction, that is, upward or increase or decrease the number of the hooks in each row to obtain a necessary engaging force.

The male portion 230 of the surface fastener member 204 may have a configuration of the first to fifth modification described in the first embodiment.

Further, it is also permissible to dispose the cord fastener of the aforementioned first or second embodiment halfway of the tightening cord A and attach the cord fasteners of the third embodiment to ends of the tightening cord A so that cord fasteners of different types are used at the same time.

The cord fastener of the present invention has the above described structure and the following effects are achieved by these structures.

According to the invention, a cord fastener made of thermoplastic resin having cord insertion holes 7, 15, 107, 115, 23 is so constructed that a surface fastener member 4, 104, 204 is disposed on an outside face of the cord fastener away from the cord insertion holes 7, 107, 23 in the cord fastener, the cord fastener through which the tightening cord A is threaded and the cord fastener in which an end portion of the tightening cord A is nipped can be captured and fixed easily with stability at a predetermined position of a product using any of the same cord fasteners, thereby eliminating a possibility that the cord fastener swings freely providing an uncomfortable feeling.

According to the invention, as the cord fastener further comprises a sliding body 2, 102 having the cord insertion hole 15, 115 passing to both sides and an elastic mechanism 17, 117 provided at a bottom thereof and a main body 1, 101 in which the sliding body 2, 102 Is fitted and having an escape preventing mechanism 11, 111 for preventing the sliding body 2, 102 f rom being escaped and the cord insertion hole 7, 107 provided on both sides thereof, wherein the surface fastener member 4, 104 is disposed on an outside f ace of the main body 2, 102, the cord fastener is constituted of the main body 1, 101 and the sliding body 2, 102 having a resiling mechanism, so that the cord fastener can be fixed easily with stability thereby providing an appearance beautiful to see.

According to the invention, as the cord fastener further comprises a pair of nipping bodies 3 which engage with each other by superimposing, wherein the cord insertion hole 23 is provided at a top portion of the pair of the nipping bodies 3, cord nipping mechanism 26 is provided on opposing faces of the nipping bodies 3 and the surface fastener member 204 is disposed on an outside face of the nipping body 3, the cord fastener is constituted of a pair of the nipping bodies 3 so that the cord fastener can be fixed easily with stability thereby providing an appearance beautiful to see.

According to the invention, as the cord fastener is so constructed that a male portion 30, 130, 230 of the surface fastener member 4, 104, 204 disposed on an outside face of the main body 1, 101 or nipping body 3 is formed integrally with the main body 1, 101 or nipping body 3 by injection molding means or extrusion means, the male portion 30, 130, 230 of the surface fastener member 4, 104, 204 is formed integrally at the same time when the main body 1, 101 or nipping body 3 is formed, production efficiency is improved. Further, there is an advantage that the male portion 30, 130, 230 is never peeled.

According to the invention, as the cord fastener is so constructed that the surface fastener member 4, 104, 204 disposed on the outside surface of the main body 1, 101 or nipping body 3 is formed by bonding the male portion 30, 130, 230 of the surface fastener member 4, 104, 204 formed by injection molding or extrusion to the surface of the main body 1, 101 or nipping body 3, the male portion 30, 130, 230 of the existing surface fastener member 4, 104, 204 formed by injection molding or extrusion can be applied to the main body 1, 101 or nipping body 3 easily thereby meeting user demand quickly.

According to the invention, as the cord fastener is so constructed that the surface fastener member 4, 104, 204 disposed on the outside surface of the main body 1, 101 or nipping body 3 is the surface fastener member 4, 104, 204 formed by weaving or knitting multi-filament 33 or mono-filament 32 of synthetic fiber, the surface fastener member 4, 104, 204 being bonded to the surface of the main body 1, 101 or nipping body 3, the male portion 30, 130, 230, female portion 31 or female/male mixing portion of the surface fastener member 4, 104, 204 formed by weaving or knitting existing multi-filament 33 or mono-filament 32 of synthetic fiber to the main body 1, 101 or nipping body 3 can be used easily thereby meeting user demand quickly.

According to the invention, the cord fastener is so constructed that the surface fastener member 4, 104, 204 is disposed on the both outside surfaces of the main body 1, 101 or the both outside surfaces of the nipping bodies 3, the cord fastener can be captured and fixed on the surface of a product using the same cord fastener quickly and easily without paying attention to the sides of the cord fastener upon use.

According to the invention, as the cord fastener is so constructed that the surface fastener member 4, 104, 204 is disposed on the outside surface thereof and other surface fastener member 40 engaging with the surface fastener member 4, 104, 204 is disposed on part of a surface of a product using the cord fastener such that both the surface fastener members 4, 104, 204, 40 are capable of engaging with each other, the cord fastener can be captured and fixed accurately at a predetermined position of the product thereby providing a neat appearance.

What is claimed is:

1. A cord fastener made of thermoplastic resin wherein a surface fastener member having a plurality of male engaging elements capable of surface engagement with a companion surface by pressing is disposed, wherein said cord fastener comprises a sliding body having a first cord insertion hole passing to both sides and an elastic mechanism provided at a bottom thereof and a main body engaging with said sliding body and having an escape preventing mechanism for preventing said sliding body from being escaped and a pair of cord insertion holes provided on both sides thereof, wherein the surface fastener member is disposed on an outside face of the main body.

2. A cord fastener made of thermoplastic resin wherein a surface fastener member having a plurality of male engaging elements capable of surface engagement with a companion surface by pressing is disposed, wherein said cord fastener comprises a pair of nipping bodies which engage with each other by superimposing, wherein a first cord insertion hole is provided at a top portion of said pair of nipping bodies, a cord nipping mechanism is provided on opposing faces of said pair of nipping bodies and the surface fastener member is disposed on an outside face of at least one of said nipping bodies.

3. A cord fastener according to claim 1 or 2, wherein a male portion composed of said plurality of male engaging elements of the surface fastener member disposed on a outside face of said cord fastener is formed integrally with said cord fastener by injection molding or extrusion.

4. A cord fastener according to claim 1 or 2, wherein the surface fastener member disposed on the outside surface of said cord fastener is formed by bonding a male portion composed of said plurality of male engaging elements of the surface fastener member formed by injection molding or extrusion to the surface of said cord fastener.

5. A cord fastener according to claim 1 or 2, wherein the surface fastener member disposed on the outside surface of said cord fastener is the surface fastener member formed by weaving or knitting multi-filament or mono-filament of synthetic fiber, said surface fastener member being bonded to the surface of said cord fastener.

6. A cord fastener made of thermoplastic resin having at least a first cord insertion hole, wherein a surface fastener member having a plurality of male engaging elements capable of surface engagement with a companion surface by pressing is disposed on an outside face of said cord fastener, and wherein a second surface fastener member is disposed on the outside of said cord fastener.

7. A cord fastener made of thermoplastic resin having at least a first cord insertion hole, wherein a surface fastener member having a plurality of male engaging elements capable of surface engagement with a companion surface by pressing is disposed on an outside face of said cord fastener, and wherein another surface fastener member engaging with said surface fastener member is disposed on part of a surface of a product using said cord fastener such that both the surface fastener members are capable of engaging with each other.

8. A cord fastener according to claim 6 or 7, wherein a male portion composed of said plurality of male engaging elements of the surface fastener member disposed on a outside face of said cord fastener is formed integrally with said cord fastener by injection molding or extrusion.

9. A cord fastener according to claim 6 or 7, wherein the surface fastener member disposed on the outside surface of said cord fastener is formed by bonding a male portion composed of said plurality of male engaging elements of the surface fastener member formed by injection molding or extrusion to the surface of said cord fastener.

10. A cord fastener according to claim 6 or 7, wherein the surface fastener member disposed on the outside surface of said cord fastener is the surface fastener member formed by weaving or knitting multi-filament or mono-filament of synthetic fiber, said surface fastener member being bonded to the surface of said cord fastener.

* * * * *